United States Patent [19]

McMahon

[11] 3,794,979

[45] Feb. 26, 1974

[54] MICROPROGRAMMED CONTROL UNIT WITH MEANS FOR REVERSING AND COMPLEMENTING MICROINSTRUCTIONS

[75] Inventor: Robert F. McMahon, Wappingers Falls, N.Y.

[73] Assignee: International Business Machines Corporation, Armonk, N.Y.

[22] Filed: Mar. 2, 1973

[21] Appl. No.: 337,490

[52] U.S. Cl. .......... 340/172.5
[51] Int. Cl. .......... G06f 9/16
[58] Field of Search .......... 340/172.5

[56] References Cited

UNITED STATES PATENTS

| | | | |
|---|---|---|---|
| 3,302,183 | 1/1967 | Bennett et al. | 340/172.5 |
| 3,325,785 | 6/1967 | Stevens | 340/172.5 |
| 3,634,883 | 1/1972 | Kreidermacher | 340/172.5 |

*Primary Examiner*—Paul J. Henon
*Assistant Examiner*—Melvin B. Chapnick
*Attorney, Agent, or Firm*—Edward S. Gershuny

[57] ABSTRACT

A microprogrammed control unit comprising an instruction memory for storing microinstructions and an address memory for storing the addresses of microinstructions which make up a microprogram. Each microinstruction within the instruction memory can be transmitted to an instruction data register in any of various formats. In the preferred embodiment, the microinstruction can be in one of four forms: unchanged; reversed; complemented; or reversed and complemented. Since each microinstruction within the instruction memory can be transmitted to the data register in any of these four forms, the number of microinstructions that must be stored in the instruction memory is substantially reduced.

10 Claims, 6 Drawing Figures

MICROPROGRAMMED CONTROL UNIT WITH MEANS FOR REVERSING AND COMPLEMENTING MICROINSTRUCTIONS

BACKGROUND OF THE INVENTION

This invention relates to control units for controlling the sequence of elementary operations within an electronic digital computer. More particularly, the invention relates to a microprogrammed control unit which is of reduced physical size.

A substantial percentage of all computers built in recent years have utilized microprogrammed control units to control the operations performed by a central processing unit (CPU) during the execution of an instruction. Under control of the microprogrammed control unit, the instruction is executed by the performance of a sequence of elementary operations, each of which occurs during a single CPU cycle. During each of these cycles, elementary operations are performed under the control of a microinstruction which has been accessed from the control unit. Generally, within a single CPU cycle, several elementary operations are performed (in parallel and/or in sequence within the cycle). Each elementary operation is performed under control of a "micro-order." A microinstruction thus contains several micro-orders, each of which is performed during one CPU cycle. A sequence of microinstructions which execute a given function (for example, a software instruction) make up a microprogram or micro routine.

In most microprogrammed systems, microinstruction sequencing is achieved by allocating a portion of each microinstruction for indicating the address of the next microinstruction to be performed. The next address portion is fed, along with branching controls, to the address register of the control unit in order to select the next microinstruction to be performed. In such a system, if a given microinstruction is used in several different micro routines, the instruction will be stored at several different places within a control storage. This replication is one factor which tends to increase the size of the control unit.

Another factor which affects the size of the control unit is micro-order density. Within each microinstruction, various fields are allocated to specific types of classes of micro-orders. If, within a given microinstruction, one or more of the micro-order classes is not utilized, then the field or fields allocated thereto will contain no information that is of substantial use to the system. The presence in the control storage of fields which, in effect, contain no information of value to the system also tend to increase the size of the control unit.

A system wherein there is no replication has been proposed by A. Graselli, "The Design of Program-Modifiable Micro-Programmed Control Units" IRE Transactions on Electronic Computers, June 1962, pages 336–339. In that system, microinstructions are stored in a control memory. The microinstructions do not contain a next address field. Sequencing of microinstructions is accomplished through the use of a path finder memory which may be loaded with sequences of microinstruction addresses which control the sequencing within a micro routine.

A system which provides increased micro-order density is described in copending application Ser. No.

316,792 filed Dec. 20, 1972 by H.E. Frye and R. F. McMahon for FULL CAPACITY SMALL SIZE MICROPROGRAMMED CONTROL UNIT. In the system described in said application, micro-orders are densely stored in the instruction storage of a control unit. Each time that a word is accessed from the instruction storage, a mask which is stored along with the address in the address storage is utilized to select appropriate micro-orders to produce a desired microinstruction.

SUMMARY OF THE INVENTION

In accordance with this invention, there is provided a microprogrammed control unit of reduced physical size comprising an instruction memory for storing microinstructions with no repetitions, an address memory for storing the addresses of microinstructions which make up a microprogram, and circuitry for changing the format of a microinstruction. In a preferred embodiment, this circuitry comprises means for selectively complementing and/or reversing a microinstruction before it is transmitted to an instruction storage data register. Each time that a micro word is accessed from the instruction storage, control bits which are stored along with the address in the address storage will control transmission from the instruction storage to the instruction storage data register. The micro word can be transmitted to the instruction storage data register unchanged, complemented, reversed, or reversed and complemented. Through the use of the selective reversing/complementing means, most micro words become capable of supplying any of four different microinstructions to the system although only one of the four is actually stored in the instruction storage.

The primary advantage of this invention is that it permits a reduction in the number of words contained within a microprogrammed control unit. This reduction in the number of words will often lead to further advantages including, but not limited to, any or all of the following: reduction in the physical size of the control unit; reduction in power requirements; reduction in number of address bits required for addressing the instruction storage; etc. Of course, each of these advantages will tend to reduce the cost of the control unit and, therefore, the total cost of the system wherein it is utilized.

The above and other features and advantages of this invention will be apparent from the following description of a preferred embodiment thereof as illustrated in the accompanying drawings.

DETAILED DESCRIPTION

Prior Art

Figure 1:
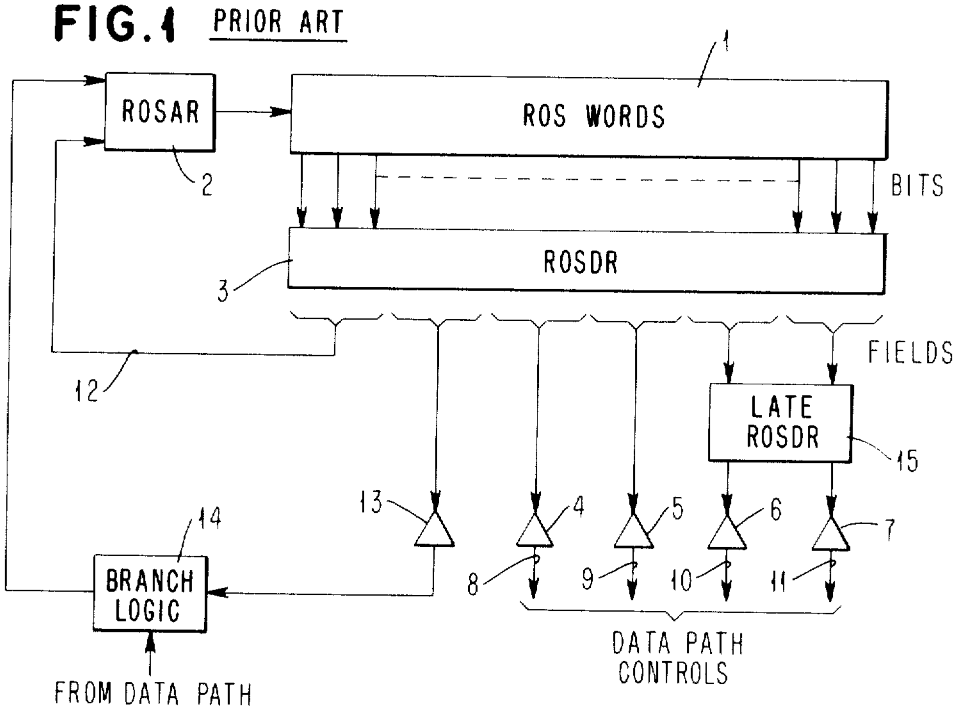
FIG. 1 PRIOR ART
FIG. 1 shows, in block diagram form, a prior art microprogrammed control unit.

FIG. 1 shows various details of a typical prior art microprogrammed control unit. A read only storage (ROS) 1 contains many words each of which is a microinstruction. Microinstructions are selected from the ROS by means of a read only storage address register (ROSAR) 2. The microinstruction that will control the operation of a central processing unit (CPU) for one cycle is read from ROS to a read only storage data register (ROSDR) 3. The microinstruction within the ROSDR is divided into fields each of which contains a micro-order. In order to decode the micro-orders and provide control signals to the computer system, a plurality of decoders 4–7 are provided. System control is provided via the decoder outputs 8–11. At least a portion of the address of the next microinstruction which is to be performed is provided to the ROSAR via line 12 from a next-address field within the microinstruction contained in the ROSDR. In order to accomplish logical branching within a micro routine, the output of a decoder 13 is applied, along with appropriate information from the system data path, to branch logic 14 the output of which also feeds the ROSAR. In order for a microinstruction to control system operation throughout a CPU cycle, the microinstruction should be in the ROSDR within a very short time after the beginning of the cycle. In order to accomplish this, it is generally necessary to set a new microinstruction into the ROSDR prior to the beginning of a cycle. However, provision must be made for saving micro-orders which control system operation at the very end of a cycle and at the immediate beginning of the next cycle. This is accomplished through the provision of a late ROSDR 15 in which certain micro-orders are saved when a new microinstruction is read into the ROSDR.

For additional details pertaining to the implementation and usage of prior art microprogrammed control units, reference is made to S.G. Tucker "Microprogram Control For System/360" IBM Systems Journal, Vol. 6, No. 4 (1967) pages 222–241 and to S.S. Husson "Microprogramming: Principles and Practices" Prentice-Hall, Inc. (1970). Both of these publications are to be regarded as being incorporated herein by this reference.

The Invention

Figure 2:
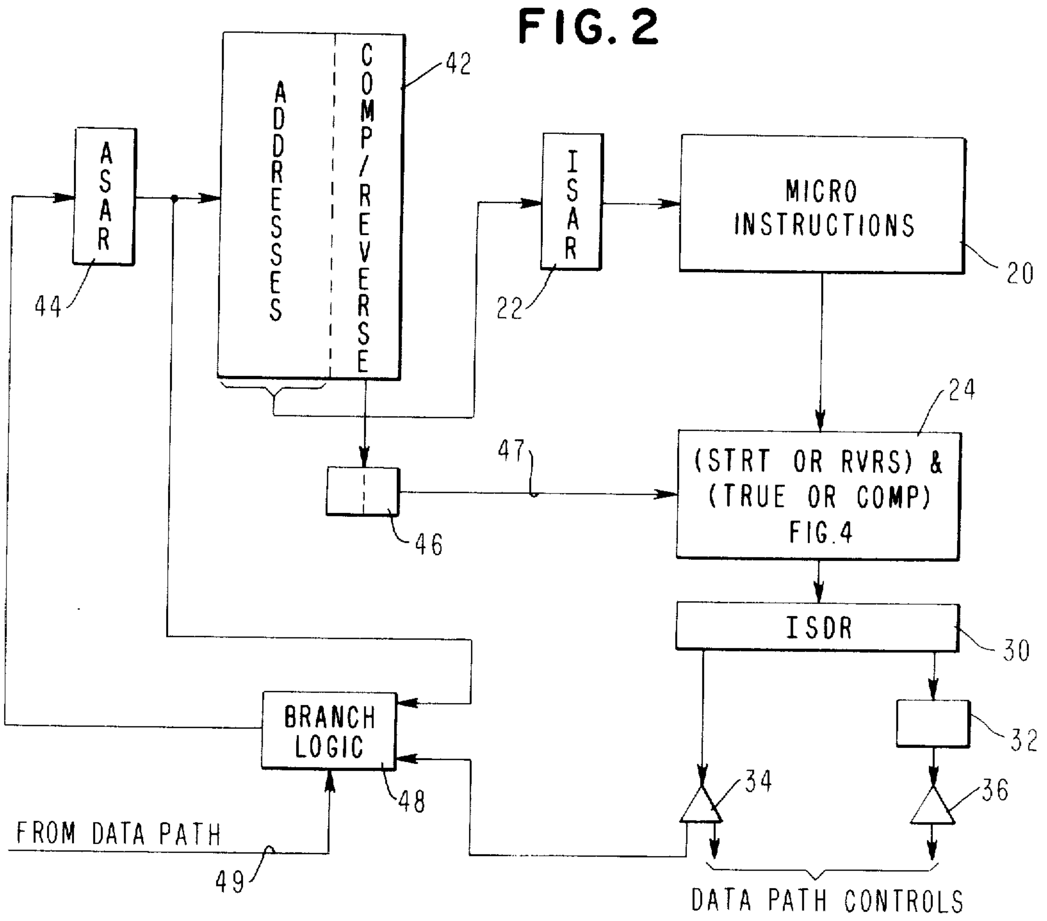
FIG. 2 depicts a microprogrammed control unit implemented in accordance with a preferred embodiment of this invention.

FIG. 2 shows various details of a microprogrammed control unit implemented in accordance with this invention. An instruction storage 20, which is preferably a read only storage, contains the micro words from which microinstructions are derived. Words are accessed from the instruction storage 20 under control of an instruction storage address register (ISAR) 22. Micro words are read from the instruction storage to a set of gates 24 the outputs of which provide a microinstruction to an output register referred to as the instruction storage data register (ISDR) 30. Connected to the ISDR 30 is a late ROSDR 32 which performs the same function as the late ROSDR 15 which was described with respect to FIG. 1. Also provided in the system shown in FIG. 2 are a plurality of decoders 34, 36 which perform the same functions as the decoders 4–7 and 13 which are shown in FIG. 1.

In addition to the instruction storage 20, an address storage unit 42 is provided. Each word within the address storage contains the address of a word in the instruction storage 20 and control bits for controlling the gates 24. Words are accessed from the address storage 42 under control of an address storage address register (ASAR) 44. When words are read from the address storage, the control bits are read into an address storage data register ASDR 46. Although the address field of a word within the address storage 42 could also be read into the ASDR, in the preferred embodiment of the invention this address field is read directly into the ISAR 22. In order to provide for branching within a micro routine, branch logic 48 is provided. The branch logic receives its inputs from the ASAR 44, from the data path along line 49, and, in the preferred embodiment, from at least one of the decoders 34. The output of the branch logic 48 is used to control the addresses set into ASAR 44.

Organization of Instruction Storage

Figure 3:
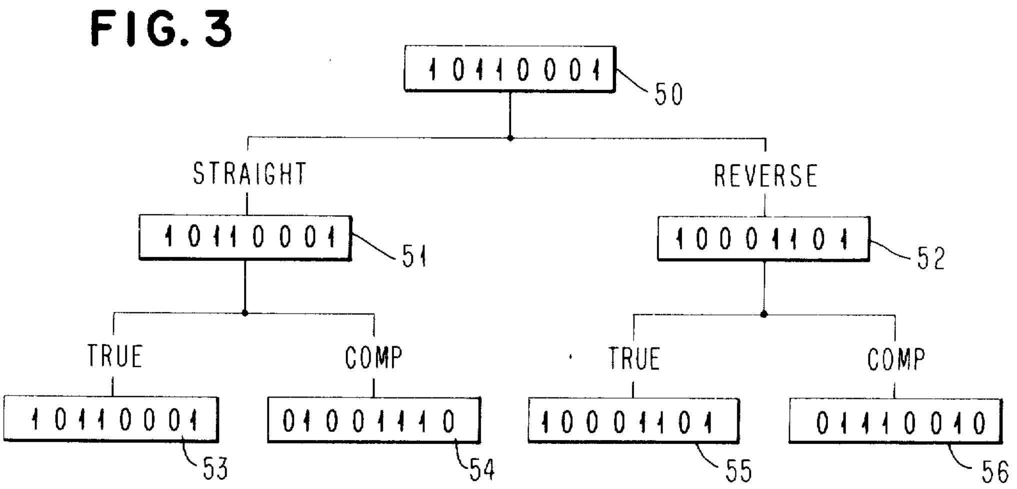
FIG. 3 is a diagram illustrating the manner in which four different microinstructions can be derived from a single microinstruction by the control unit of FIG. 2.

The diagram of FIG. 3 will be used both to explain the organization of the instruction storage 20 and the operations that are performed by the gates 24 of FIG. 2. Block 50 shows a sequence of eight bits which represent a microinstruction or a portion thereof. One of the selective operations which may be performed by the gates 24 is shown in blocks 51 and 52. A microinstruction read from the instruction store 20 may be utilized in a STRAIGHT (that is, unchanged) format as illustrated by the contents of block 51 or in a REVERSE format as illustrated by the contents of block 52. The other operation which may be performed by gates 24 is selective complementation. Block 53 shows the STRAIGHT microinstruction in its TRUE format; block 54 shows the STRAIGHT microinstruction in its COMPLEMENT format; block 55 shows the REVERSE microinstruction in its TRUE format; and block 56 shows the REVERSE microinstruction in its COMPLEMENT format. In this manner, a single microinstruction (as illustrated by the contents of the block 50, FIG. 3) which is read from an instruction store (20, FIG. 2) can be operated upon by selective reverse/complement gates (20, FIG. 2) to produce any one of the microinstructions illustrated in blocks 53–56 of FIG. 3 before the microinstruction is loaded into an ISDR (30, FIG. 2).

Since, with this invention, any one of the microinstructions illustrated by the contents of blocks 53–56 of FIG. 3 may be derived from any of the other microinstructions illustrated in those blocks, only one of those microinstructions need be stored in an instruction storage. Thus, with this invention, the number of microinstructions that need be stored in an instruction storage can be reduced by nearly three-fourths. Of course, certain practical considerations may limit the reduction in storage that is achieved with this invention in a given implementation.

One limitation upon the reduction in storage size attainable with this invention is the fact that, in most systems, not all bit configurations represent valid microinstructions. The amount by which storage may be reduced when using this invention will depend upon the number of valid microinstructions which are related to each other in the manner shown in FIG. 3.

Even in a system where all bit configurations represent valid microinstructions, the instruction storage savings attainable with this invention would be a little less than three-fourths. Given a system wherein each microinstruction contains $n$ bits, there are $2^n$ possible different microinstructions. With this invention, the $2^n$ different microinstructions can be represented by: $2^{n-2} + 2^{n/2-1}$ different words if $n$ is an even number; or $2^{n-2} + 2^{(n-3)/2}$ different words if $n$ is an odd number. As $n$ increases, the maximum savings realizable with this invention rapidly approaches three-fourths. For $n = 15$ or 16, the theoretical saving is 74.8 percent; for $n = 23$ or 24, the theoretical saving is 74.99 percent.

Organization of Address Store

Each word within the address store 42 contains the address of a word in the instruction store 20. In order to control a sequence of microinstructions which make up a micro routine, blocks of words in address store 42 are arranged in such an order as to specify the desired sequence in which words are to be accessed from the instruction store in order to accomplish a micro routine. In order to control the selective reversal and/or complementation of the microinstructions, each word within the address store 42 also contains a COMP-/REVERSE field which, from ASDR 46, is used via lines 47 to furnish control signals to gates 24. In the preferred embodiment, the COMP/REVERSE field contains two bit positions one of which signals whether or not the microinstruction is to be reversed, and the other of which signals whether or not the microinstruction is to be complemented. Thus, under control of the COMP/REVERSE field any microinstruction may be transmitted from the instruction store 20 to the ISDR 30 unchanged, reversed, complemented, or reversed and complemented.

Branching

During most of the time that the control unit shown in FIG. 2 is controlling operations within a data processing machine, the control unit will access successive words from address storage 42 and use them to select and, depending upon the contents of the COMP-/REVERSE field, to complement and/or reverse appropriate words from instruction storage 20 to produce the microinstructions that are required to execute a particular CPU function. When the control unit is running sequentially in this manner, the branch logic 48 will perform as a simple counter, merely incrementing by 1 the address appearing in ASAR 44 during each cycle in order to cause a reference to the next successive word in address storage 42. However, situations will arise when, depending upon the condition of certain data and/or machine states, microprogram branching may be necessary.

In the preferred embodiment of the invention, branching is achieved in a manner that is substantially identical to that described in the above-referenced Tucker article. The branch logic 48 shown in FIG. 2 is similar to that shown in the Tucker article in that it receives inputs from the data path via line 49 and from at least one of the decoders 34, and its output is fed to the address register ASAR 44. This system differs from that shown by Tucker in that branch logic 48 also receives an input from ASAR 44. This is necessary because normal (that is, no-branch) sequencing is attained by merely incrementing the present ASAR address. The "Y-branch" described by Tucker (see particularly pages 230 and 231) may be achieved when using this invention by allowing data and/or machine status conditions to affect one or more address bits in the manner described by Tucker. Also, via line 49 into the branch logic 48, specific addresses that are stored elsewhere in the machine system can be set into ASAR 44 to permit branching within and among micro routines.

Another branching technique which may be used with this invention is described by A. Graselli, "The Design of Program-Modifiable Micro-Programmed Control Units" IRE Transactions on Electronic Computers, June 1962, pages 336–339, which publication is hereby incorporated into this specification. In the Graselli system, branching is achieved through the utilization of tags which mark the beginning and the end of a microprogramming loop. When the address of the last microinstruction in a loop is accessed, the tag associated with this address will signal the system that, depending upon data and/or system status, the next address to be accessed from the address memory 42 will be the address contained either in the next sequential word or the address contained in the word which was tagged as being the beginning of the microprogramming loop.

Complement/Reverse Gates

Figure 4:
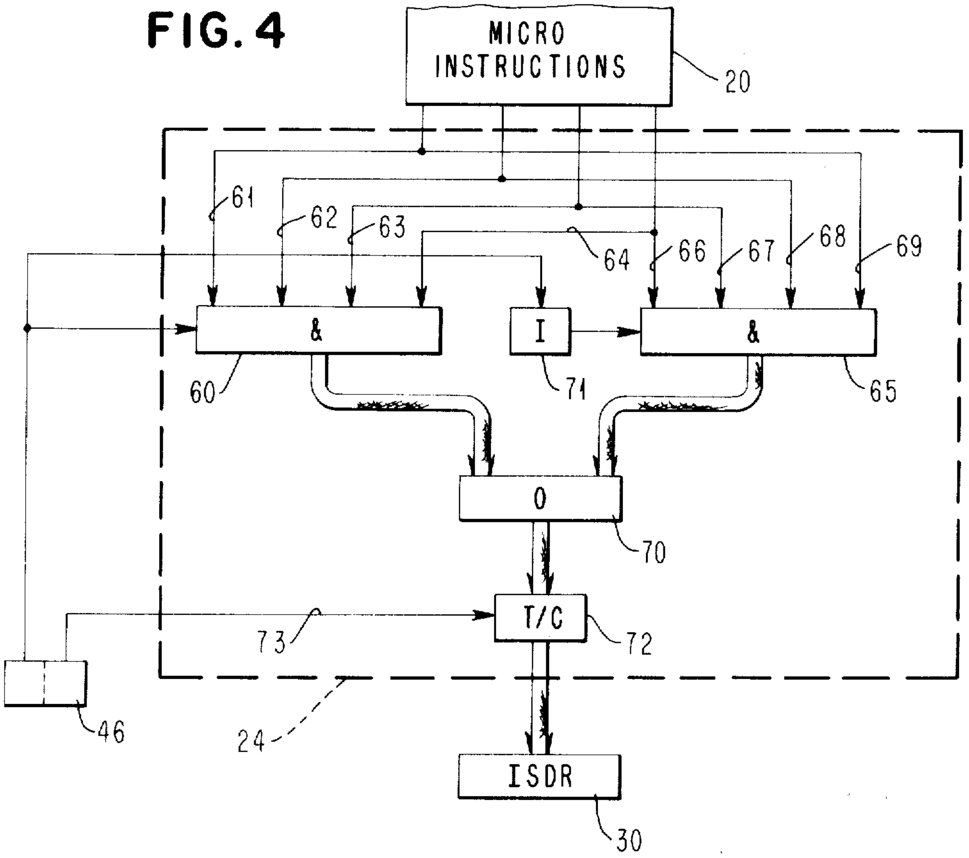
FIG. 4 shows additional details of the selective reverse/complement circuitry used in FIG. 2.

The gates 24 which are used for selective reversal and/or complementation of words read from the instruction store 20 are shown in more detail in FIG. 4. Microinstructions read from the instruction store are transmitted STRAIGHT (that is, unchanged) to a group of AND circuits 60 via lines 61–64. At the same time, the microinstruction read from the instruction store is transmitted in REVERSE format to a second group of AND circuits 65 via lines 66-69. When the microinstruction is to be transmitted in its STRAIGHT format, a "one" bit in the left-hand position of the ASDR 46 will enable ANDs 60 to pass the STRAIGHT microinstruction to OR 70. When the REVERSE format of the microinstruction is desired, a "zero" bit in the left-hand position of ASDR 46 will, after inversion by inverter circuit 71, enable ANDs 65 to pass the REVERSE microinstruction to OR 70. The microinstruction, in its STRAIGHT or REVERSE format, will pass through OR 70 to appropriate true/complement (T/C) circuitry 72. T/C 72 will, in response to an appropriate control signal on line 73 from the ASDR 46, transmit the microinstructions to ISDR 30 in the appropriate format. In this manner, depending upon the control bits contained in ASDR 46, a microinstruction read from the instruction store 20 can be transmitted to the ISDR 30 unchanged, reversed, complemented, or reversed and complemented.

Operation of the Control Unit

A microprogram or micro routine is started by loading an initial address into the ASAR 44 in exactly the same manne/that is described in the above-referenced Tucker and Husson publications. Thereafter, the control unit of this invention operates in a sequence that is illustrated by the timing diagram shown in FIG. 5. At the beginning of each CPU cycle, there is a main clock pulse which is shown in the first line of FIG. 5. Then, during each cycle (as illustrated by the next three lines in FIG. 5) data is gated out of various registers, operated upon in the system adder, shifted as appropriate, and then (at the very beginning of the next CPU cycle) gated into destination registers. In order for a microinstruction to be available for system control at the very beginning of a cycle, it is necessary that the microinstruction be set into the ISDR 30 (FIG. 2) just prior to the beginning of the cycle as is shown by the line labeled SET ISDR. Prior to setting of the ISDR, address and control bits must be read from the address storage 42 (FIG. 2) at an appropriate time as is shown by the line labeled SET ASDR. Also, prior to setting of the ASDR, all branch conditions must be resolved. As is shown in the next-to-last line in FIG. 5, a control unit memory cycle is divided into three portions: branch logic resolution; memory access (including setting of ASDR followed by setting of ISDR); and microinstruction decode. The decoding is completed by the beginning of the next cycle. The last line in FIG. 5 shows the setting of the late ROSDR for the reasons previously described.

Figure 5:
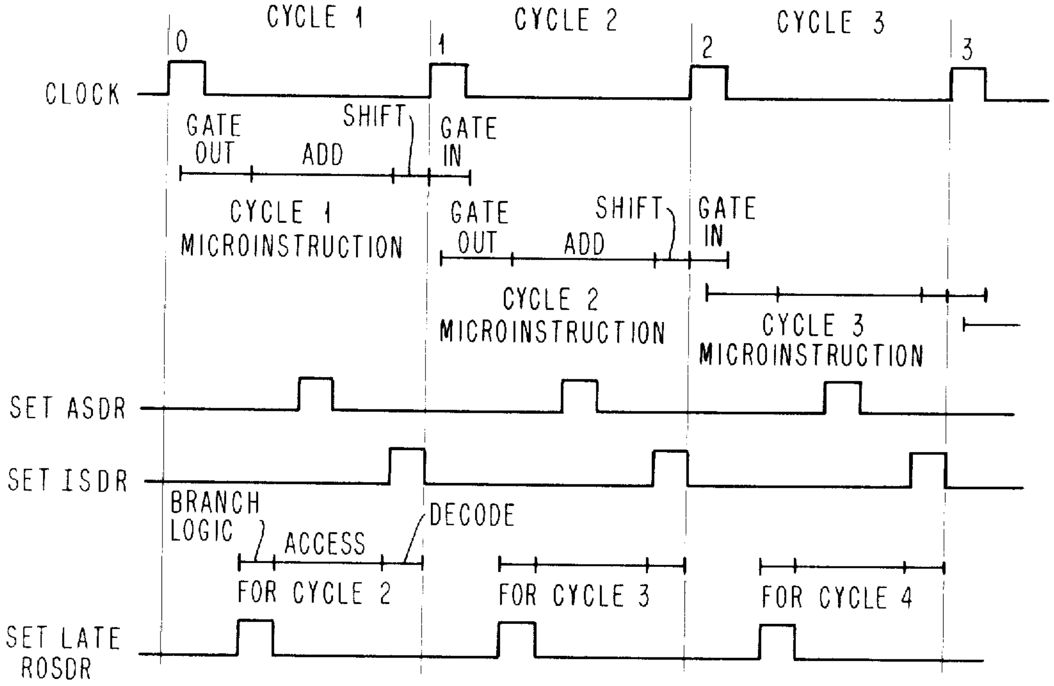
FIG. 5 is a timing diagram illustrating the sequence of operations performed by the control unit of FIG. 2.

With the exception of the line labeled SET ASDR, all of the timing lines shown in FIG. 5 are identical to those shown in FIG. 4 (page 231) of the above-referenced Tucker article. It should be noted that the interposition of the SET ASDR pulse between the branch logic resolution and the setting of ISDR (which corresponds to Tucker's SET ROSDR) may introduce timing problems in some systems. If one were to implement this invention using control unit memories which could not be operated quickly enough to sequentially read out from an address memory and from an instruction memory after branch logic resolution, an alternative method of branching could be used. In the alternative method, ASDR would be set early in the cycle, prior to complete resolution of the branch logic, under the assumption that no branch is to be taken. That is, the previous ASDR address would simply be incremented by 1. Then, if the branch logic were to indicate that a branch is to be taken (meaning that the address in ASDR is not correct), the next SET ISDR pulse would be inhibited to prevent readout of an incorrect microinstruction and the system would lose one cycle while the ASDR is being updated to properly reflect the microprogram branch.

Parity Handling

For error detection, the bits which make up a microinstruction within the instruction store may have one or more parity bits associated therewith. In a preferred embodiment of this invention, the bits which make up a microinstruction are divided into N groups each having a parity bit associated with it. All of the N groups are preferably placed in a designated block, or portion, of the micro word. Assuming that each word in the instruction store contains instruction bits and parity bits, we must consider the effect upon the parity bits of reversal and/or complementation of a microinstruction.

Complementation

When a group of data bits are complemented: if there are an even number of bits in the group, parity will be unchanged; if there are an odd number of bits in the group, parity will be reversed. When implementing this invention in a system wherein the microinstruction parity groupings contain an even number of data bits, it is preferred that the parity bits be passed through circuitry (which may, if desired, be physically packaged with the true/complement gates) which will not complement the parity bits even if the data bits are complemented. An alternative would be to allow the parity bits to be complemented when the data bits are complemented (or even, if desired, when the data bits are not complemented) and utilize subsequent parity check circuits which look for a parity which is opposite to the starting parity. This alternative is not recommended.

Reversal

Figure 6:
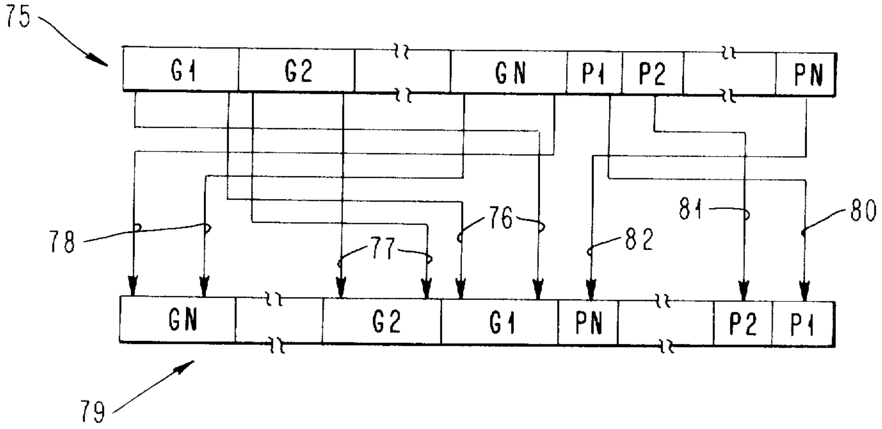
FIG. 6 illustrates the manner in which parity bits are handled in the preferred embodiment of the invention.

If the data bits are reversed, and if all of the parity groupings contain the same number of data bits, correct parity can be maintained simply by reversing the sequence of the parity bits. This operation is illustrated in FIG. 6. A microinstruction word 75 contains instruction bits divided into M groupings of equal size G1–GN. For each group of instruction bits there is an associated parity bit P1-PN, respectively. If the microinstruction is required to be in its REVERSE format, the bits in group G1 will be transmitted by lines 76, the bits in group G2 will be transmitted by lines 77, . . . , and the bits in the last group GN will be transmitted by lines 78. (For purposes of clarity, only two lines are shown for transmitting each group of instruction bits, it being recognized that there will be one line for each bit in each group.) The microinstruction in its REVERSE format is shown in block 79. The sequence of the groups, GN–G1, is reversed, and the sequence of bits within each group is also reversed. When the instruction bits are reversed, the parity bits P1-PN are also reversed. Parity bit P1 is transmitted via line 80, parity bit P2 is transmitted via line 81, . . . , and parity bit PN is transmitted via line 82. In block 79, instruction bit group GN now appears in the left-most portion of the microinstruction and its associated parity bit PN is the left-most parity bit; instruction bit group G1 appears in the right-most portion of the microinstruction and its associated parity bit P1 is the right-most parity bit. Aside from reversing the sequence of the parity bits, no parity correction is required when the instruction bits are reversed.

Modifications to the Invention

Many modifications may be made in any given implementation of this invention. For example, the reverse/-complement mechanism shown in FIG. 4 could be modified by including one or more buffer registers for holding intermediate results of the various operations upon a given microinstruction. One manner of implementing such a modification would be to replace OR circuit 70 in FIG. 4 with a buffer register which would retain a STRAIGHT or REVERSE format microinstruction for subsequent transmission through T/C gates 72 to ISDR 30. As is described in copending application Ser. No. 316,792 filed Dec. 20, 1972 (particularly with respect to FIGS. 4 and 5 thereof) such buffering may enable branch resolution to occur later in a cycle. Said copending application is incorporated herein by this reference.

Although reversal is shown to precede complementation in FIG. 4, those skilled in the art will recognize that this sequence of operations could equally well have been reversed. Also, rather than having a system with a single ISDR and performing complementation and/or reversal prior to placing a microinstruction therein, one could utilize a plurality of data registers. A different format of the microinstruction would be transmitted to each data register and, under control of the control field in the ASDR, the outputs of the appropriate data register would be gated to the instruction decoder.

It will also be recognized by those skilled in the art that the format of a microinstruction read from the instruction store can be altered by logical manipulations other than the reversal and complementation described above. For example, the bits of a microinstruction could be shifted, preferably with wraparound so that no bits are lost, to form a new microinstruction. With a two-bit control field, any one of four shift increments (including zero-shift) could be selected. Or, shifting by zero or a given amount could be combined with another operation such as reversal or complementation. Other logical manipulations such as, for example, ANDing together and/or ORing together various portions of the microinstruction could also be used to change formats.

Another modification would be to use more than two selective changes of the microinstruction. If means are available for performing three alterations of a microinstruction (for example; reverse, complement, shift), a three-bit control field could control the generation of any one of eight different microinstructions from a single microinstruction. A system offering more than two manipulations will generally not yield enough additional advantages to justify its increased complexity. Also, in a given implementation it might be desirable to provide circuitry for performing only one logical manipulation. Such a system could utilize a one-bit control field.

Another alternative would be to use each word in the address memory to hold more than one address and control field. Each time that a word was read from the address memory, several addresses and control fields would be read into an address storage data register, and a counter (or other appropriate means) would be utilized to step through the sequential address and control fields.

Yet another modification would be to utilize writeable control stores instead of the read only control stores that have been referenced above. As is described by Graselli, one of the advantages of using a writeable store for the address memory is that microprograms and/or micro routines can be easily implemented and/or modified under program control.

While the invention has been particularly shown and described with reference to a preferred embodiment thereof, it will be understood by those skilled in the art that the above and other changes in form and details may be made therein without departing from the spirit and scope of the invention.

What is claimed is:

1. For use in a data processing system, a microprogram control unit comprising:

an instruction store for storing a plurality of microinstructions;

instruction store addressing means for addressing said instruction store;

instruction store output means for holding a microinstruction;

logical manipulation means connected between said instruction store and said instruction store output means for selectively altering the format of a microinstruction read from said instruction store, thereby changing it to a different microinstruction;

an address store for storing a plurality of words each containing the address of a microinstruction in said instruction store and a control field containing at least one control bit identifying the manner in which said logical manipulation means is to alter the format of a microinstruction;

address store addressing means for addressing said address store;

address store output means for holding data read from said address store;

means responsive to an address in said address store addressing means to cause a word to be read from said address store;

means for causing an address in said word to be transmitted to said instruction store addressing means;

means for causing a control field related to said last-named address to be transmitted to said address store output means;

means responsive to the address in said instruction store addressing means to cause a microinstruction to be read from said instruction store to said logical manipulation means;

means connected between said address store output means and said logical manipulation means for transmitting to the latter a representation of said control field;

said logical manipulation means selectively altering the format of a microinstruction in accordance with said representation; and means for transmitting the altered microinstruction to said instruction store output means for controlling the operation of said data processing system.

2. The microprogram control unit of claim 1 wherein:

said instruction store also stores, for each of said microinstructions, a group of parity bits related thereto; and said logical manipulation means further comprises means for altering the format of a group of parity bits in a manner related to the alteration of the related microinstruction so that the group of parity bits, after alteration, will correctly represent the parity of said different microinstruction.

3. The microprogram control unit of claim 1 wherein said logical manipulation means comprises:

reversing means for reversing the order of bits within a microinstruction.

4. The microprogram control unit of claim 1 wherein said logical manipulation means comprises:

complementing means for complementing bits of a microinstruction.

5. The microprogram control unit of claim 1 wherein said logical manipulation means comprises:

first means for selectively performing a first alteration of a microinstruction; and second means for selectively performing a second alteration of the same microinstruction;

both said first and second alterations being in accordance with said representation of said control field.

6. The microprogram control unit of claim 5 wherein:

said instruction store also stores, for each of said microinstructions, a group of parity bits related thereto; and said logical manipulation means further comprises means for altering the format of a group of parity bits in a manner related to the alteration of the related microinstruction so that the group of parity bits, after alteration, will correctly represent the parity of said different microinstruction.

7. The microprogram control unit of claim 5 wherein:

one of said first and second means comprises complementing means for complementing bits of a microinstruction.

8. The microprogram control unit of claim 5 wherein:

one of said first and second means comprises reversing means for reversing the order of bits within a microinstruction.

9. The microprogram control unit of claim 8 wherein:

the other of said first and second means comprises complementing means for complementing bits of a microinstruction.

10. The microprogram control unit of claim 9 wherein:

said instruction store also stores, for each of said microinstructions, a group of parity bits related thereto; and said logical manipulation means further comprises means for altering the format of a group of parity bits in a manner related to the alteration of the related microinstruction so that the group of parity bits, after alteration, will correctly represent the parity of said different microinstruction.

* * * * *